Nov. 1, 1960  J. A. RAMIREZ, SR  2,958,564
INTERNAL COMBUSTION ENGINE PISTON AND PISTON RINGS THEREFOR
Filed Aug. 26, 1958
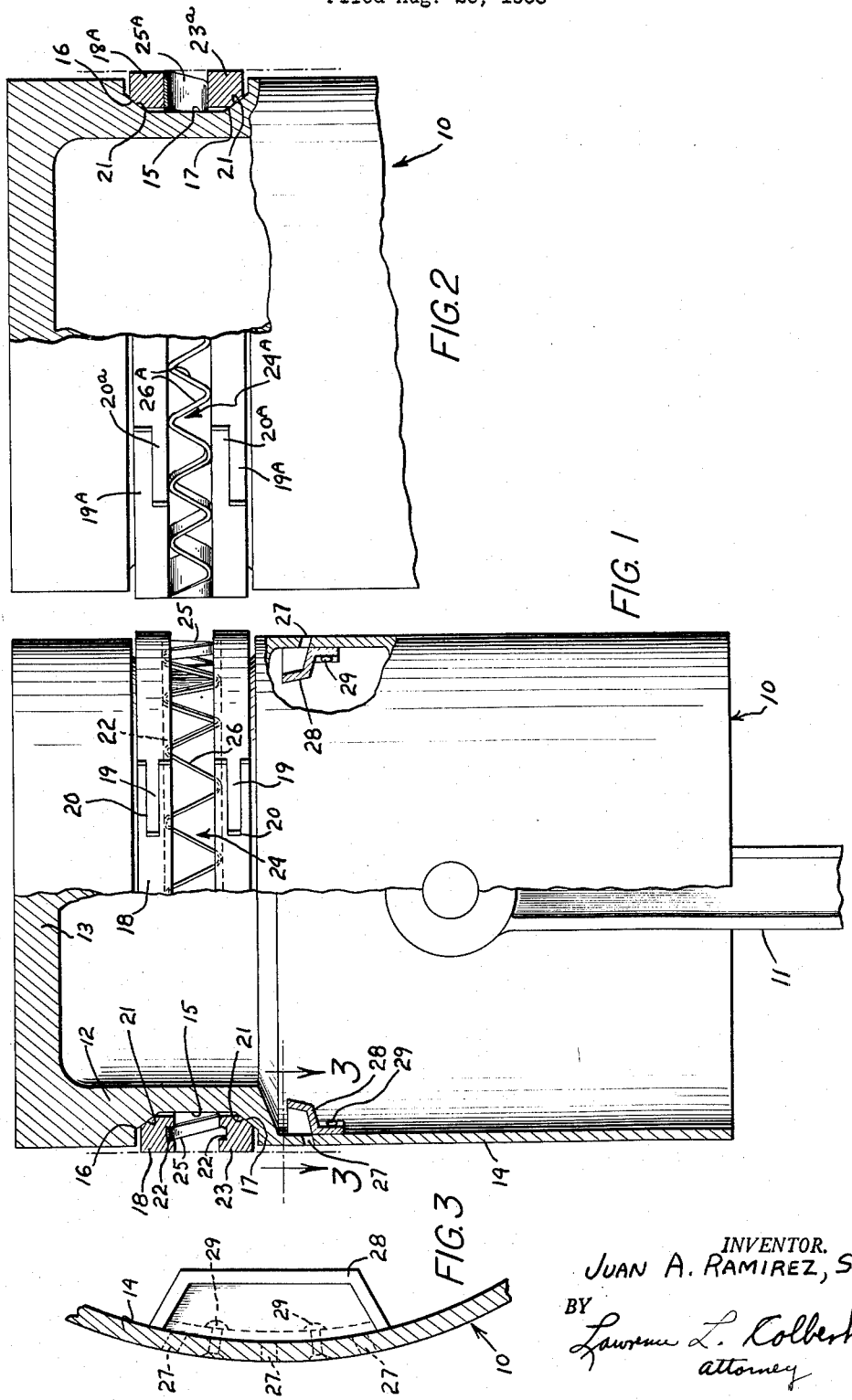
INVENTOR.
JUAN A. RAMIREZ, SR.
BY
Lawrence L. Colbert
attorney

United States Patent Office 2,958,564
Patented Nov. 1, 1960

2,958,564

INTERNAL COMBUSTION ENGINE PISTON AND PISTON RINGS THEREFOR

Juan A. Ramirez, Sr., 3929 Hueco, El Paso, Tex.

Filed Aug. 26, 1958, Ser. No. 757,316

2 Claims. (Cl. 309—7)

The present invention relates to an internal combustion engine piston and piston rings combined therewith.

The primary object of the invention is to provide a piston and piston ring combination in which the rings are cammed outwardly by means on the piston.

Another object of the invention is to provide a piston and piston ring combination of the class described above in which resilient means are provided for biasing a pair of rings axially apart with means on said piston for camming said rings outwardly when moved axially.

A further object of the invention is to provide means on a piston of the class described above for lubricating the outer wall of the piston.

A still further object of the invention is to provide a piston ring combination with a piston wherein resilient means extend between the rings biasing the rings apart and means are provided on the rings for retaining the resilient rings therebetween.

Other objects and advantages will become apparent in the following specification when considered in light of the attached drawings in which:

Figure 1 is a side elevation of the invention showing partially broken away and in section for convenience of illustration;

Figure 2 is a fragmentary side elevation of a modified form of the invention shown partially broken away and in section for convenience of illustration; and Figure 3 is an enlarged fragmentary transverse section taken along the line 3—3 of Figure 1, looking in the direction of the arrows.

Referring now to the drawings in detail wherein like reference characters indicate like parts throughout the several figures, the reference numeral 10 indicates generally a hollow cylindrical piston having a connecting rod 11 secured thereto. The piston 10 has a cylindrical upper portion 12 carrying a top wall 13 and a cylindrical skirt 14 depending from the cylindrical upper portion 12. The cylindrical upper portion 12 is substantially thicker than the skirt 14, as can be clearly seen in Figure 1.

The cylindrical upper portion 12 of the piston 10 is provided with a relatively wide annular groove 15 arranged parallel to the top wall 13. The annular groove 15 has an outwardly and upwardly sloping upper wall 16 and an outwardly and downwardly sloping lower wall 17 arranged therein to form a pair of spaced apart cam surfaces.

An annular ring 18 having a generally rectangular cross section is positioned in the upper end of the groove 15 and is provided with a tongue 19 on one end engaging in a slot 20 on the opposite end. The ring 18 has an outwardly and upwardly sloping wall 21 formed thereon for engagement with the outwardly and upwardly sloping wall 16 of the groove 15. The ring 18 is provided with an annular generally rectangular groove 22 opening downwardly therefrom, for reasons to be assigned.

A second ring 23, identical in every respect to the ring 18, is inverted in the lower portion of the groove 15 with the sloping wall 21 thereof engaging the sloping wall 17 of the groove 15.

A spring, generally indicated at 24, is formed of a corrugated strip 25 having a plurality of angularly related sections 26 extending between the rings 18, 23 and engaging in the grooves 22 to retain the spring 24 therebetween.

Pressure from the spring 24 oppositely against the rings 18, 23 maintain the rings 18, 23 in engagement with the sloping walls 16, 17 of the group 15 so that the rings 18, 23 are cammed outwardly by the sloping walls 16, 17 to some degree. Movement of the piston 10 in the cylinder (not shown) with which it is used is effective to cause one of the rings 18, 23 to be cammed outwardly an additional amount depending upon the direction of movement of the piston 10.

The piston 10 has a plurality of oil ports 27 extending outwardly therethrough and a oil retaining cup 28 is secured to the inner wall of the skirt 14 by means of rivets 29 with the ports 27 opening out of the lower portion of the cup 28, as best seen in Figure 1. As the piston 10 reciprocates oil is thrown upwardly within the piston 10 by means (not shown) and a portion of the oil is caught in the cups 28 feeding outwardly therefrom through the ports 27 to lubricate the piston 10.

The movement of the rings 18, 23 on the cam walls 16, 17 is effective to maintain the rings 18, 23 in respective tight engagement with the walls of the cylinder during upward and downward strokes of the piston 10.

In Figure 2 a modified form of the invention is illustrated wherein a piston 10 of identical construction to the piston 10 of the preferred form of the invention is provided with a pair of spaced apart parallel rings 18a and 23a of generally rectangular cross section and having outwardly sloping walls 21 for respective engagement with the outwardly sloping walls 16, 17 of the groove 15.

The rings 18a, 23a are provided with offset overlapping opposite end portions 19a, 20a, respectively, and are identical in construction except they are inverted in the same manner as the rings 18, 23 of the preferred form of the invention. A spring, generally indicated at 24a, is formed of a corrugated strip 25a having a plurality of angularly related sections 26a. The spring 24a contacts the adjacent surfaces of the rings 18a, 23a biasing them away from each other into camming contact with the outwardly sloping walls 16, 17 of the groove 15. The spring 24a acts in an identical manner with respect to the rings 18a, 23a as the spring 24 acts with the rings 18, 23 with the exception that the spring 24a has a substantially greater width than the spring 24, and has the outer edge thereof engaging the cylinder (not shown) engaged by the rings 18a, 23a to serve as additional sealing ring means.

The piston 10 in the modified form of the invention illustrated in Figure 2, is provided with oil cups 28 in the same manner as illustrated in Figures 1 and 3.

It should be understood that while specific embodiments of the invention have been illustrated, numerous additional modifications and adaptations may be resorted to without departing from the scope of the appended claims.

What is claimed is:

1. In combination, a cylindrical piston having a circumferential annular groove therein, said groove including an inner wall parallel to the longitudinal axis of said piston, flat upper and lower walls extending perpendicular to said inner wall from the outer surface of said piston, and oblique camming walls connecting upper and lower ends of said inner wall to the inner ends of the respective upper and lower walls, and a piston ring assembly comprising upper and lower radially-expansible, annular piston rings each including an inwardly facing oblique annular surface engaging an adjacent oblique surface of said groove, resilient means extending between said rings and urging the rings axially apart, said rings having relative longitudinal movement in said groove, and said rings being alternately radially expansible and contractible in response to reciprocation of said piston in a cylinder and being spaced apart less than the height of said groove, said flat upper and lower walls limiting radial expansion of said upper and lower rings and relative longitudinal movement therebetween.

2. A device as claimed in claim 1 wherein said resilient means comprises a corrugated spring strip having a plurality of angularly related sections formed therein.

References Cited in the file of this patent

UNITED STATES PATENTS

| | | |
|---|---|---|
| 1,390,577 | Nagy | Sept. 13, 1921 |
| 1,534,765 | Briney | Apr. 21, 1925 |
| 2,083,636 | Candwell et al. | June 15, 1937 |